United States Patent [19]
McCune et al.

[11] Patent Number: 5,295,713
[45] Date of Patent: Mar. 22, 1994

[54] TONGUE ASSEMBLY

[75] Inventors: Phillip H. McCune; James P. White, both of Mt. Clemens; Keith R. Ball, New Baltimore, all of Mich.

[73] Assignee: TRW Vehicle Safety Systems Inc., Lyndhurst, Ohio

[21] Appl. No.: 993,911

[22] Filed: Dec. 18, 1992

Related U.S. Application Data

[63] Continuation of Ser. No. 744,272, Aug. 13, 1991, abandoned.

[51] Int. Cl.⁵ .................................... B60R 22/12
[52] U.S. Cl. ........................ 280/801 R; 297/483
[58] Field of Search ............... 280/801 R, 801 A; 297/468, 483, 486

[56] References Cited

U.S. PATENT DOCUMENTS

| 2,710,649 | 6/1955 | Griswold, II et al. | 297/483 |
| 4,445,709 | 5/1984 | Bost | 280/801 |
| 4,935,994 | 6/1990 | Boone et al. | 280/801 |

FOREIGN PATENT DOCUMENTS 0096153  5/1987  Japan ........................ 297/468

Primary Examiner—Eric Culbreth
Attorney, Agent, or Firm—Tarolli, Sundheim & Covell

[57] ABSTRACT

A tongue assembly is for use in a safety apparatus in which belt webbing restrains movement of an occupant of a vehicle or of a child seat. The tongue assembly includes a base, a cover, and a cam. The cam is movable into a clamping position to clamp the belt webbing against the cover to block movement of the belt webbing through the tongue assembly. The cover and the cam are rotatable together on the base in response to forces applied to the belt webbing.

7 Claims, 3 Drawing Sheets

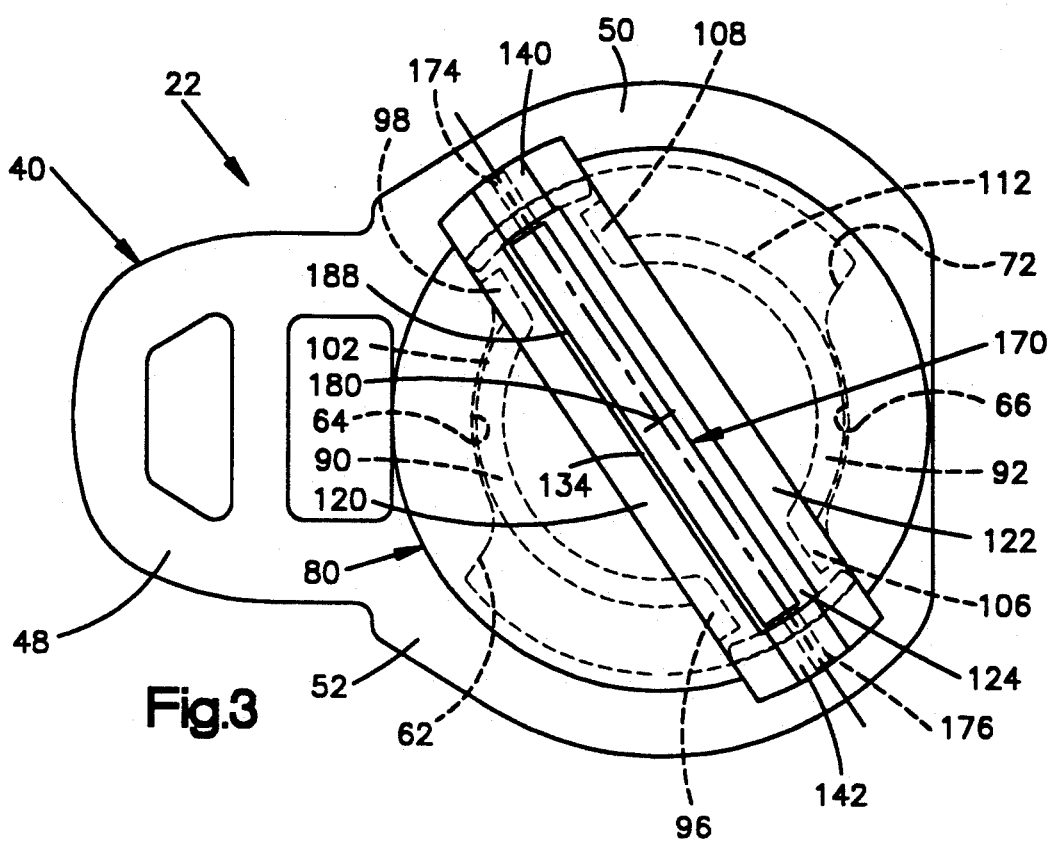
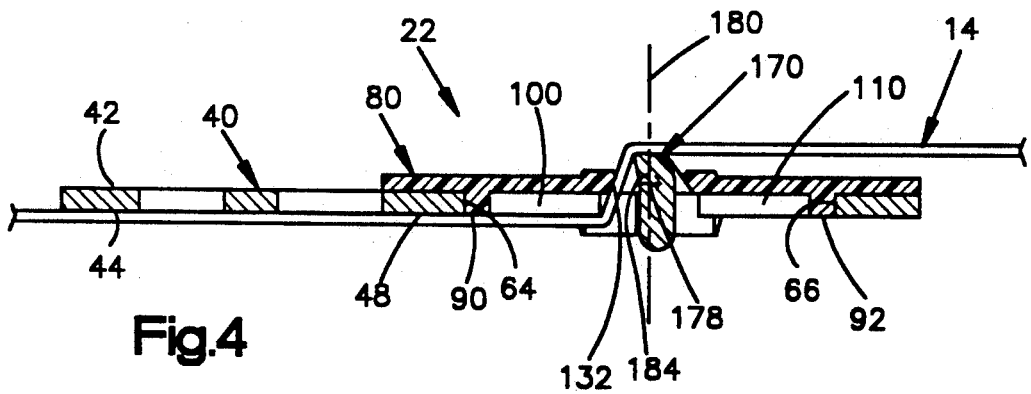
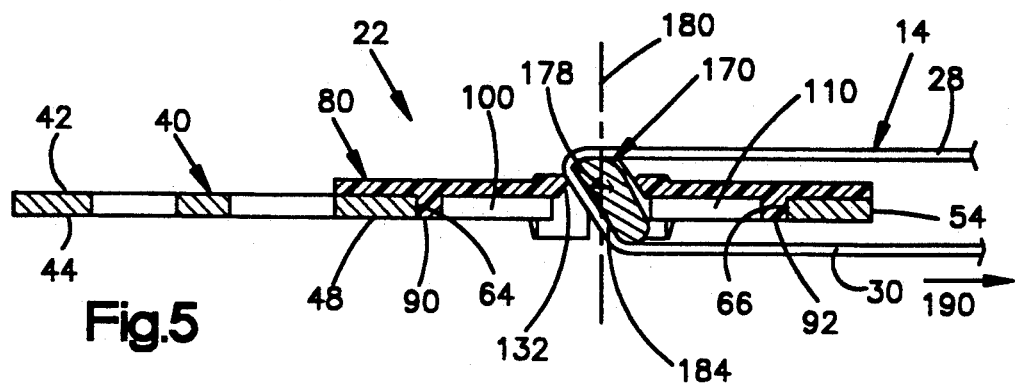

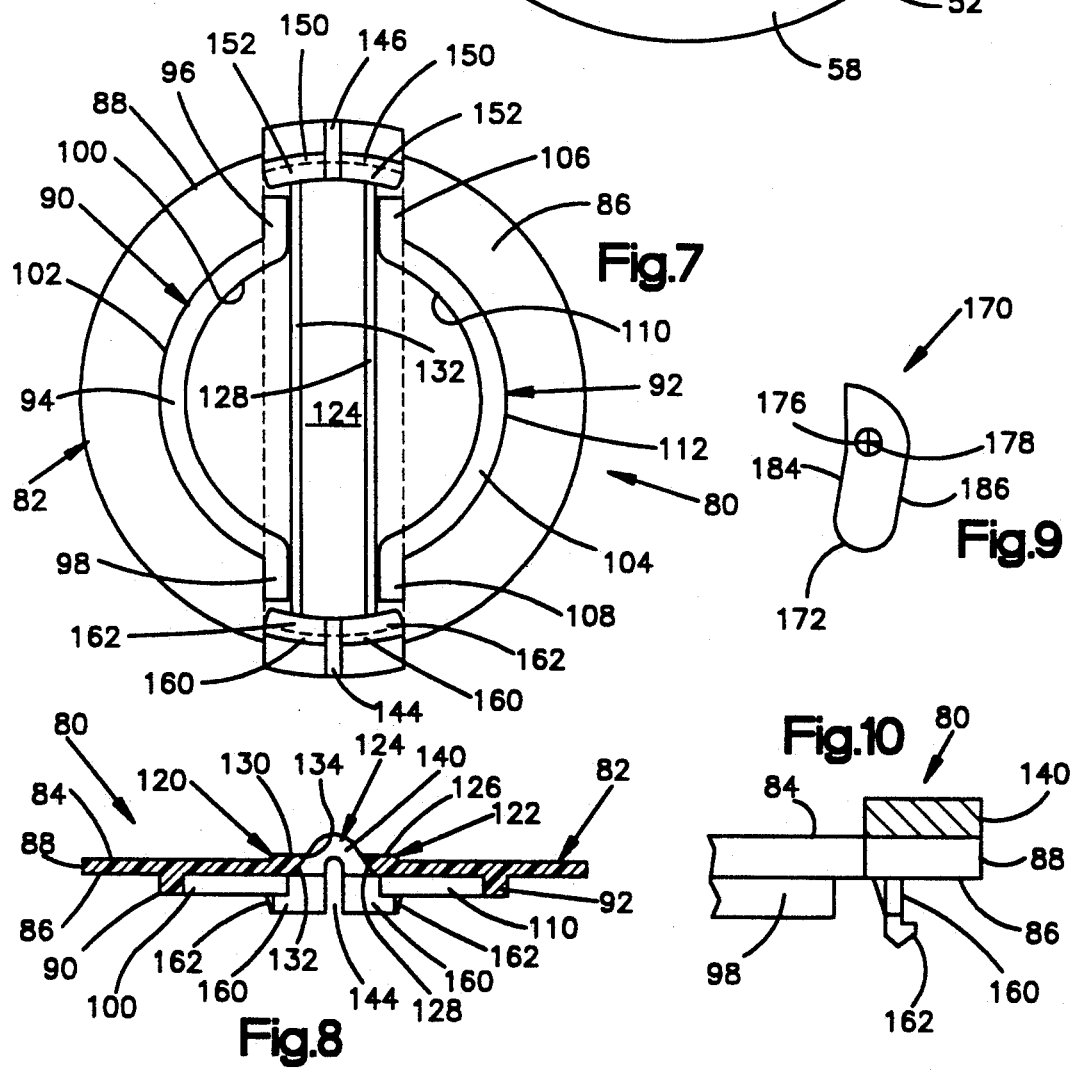

TONGUE ASSEMBLY

This is a continuation of copending application Ser. No. 07/744,272 filed on Aug. 13, 1991 now abandoned.

BACKGROUND OF THE INVENTION

1. Technical Field

The present invention relates to a tongue assembly for use in a vehicle seat belt system for restraining movement of an occupant of a vehicle.

2. Description of the Prior Art

A known type of vehicle seat belt system is a three-point continuous loop seat belt system. A three-point continuous loop seat belt system includes a seat belt retractor and a length of belt webbing. The belt webbing extends from the retractor through a D-ring fixed to the vehicle and then down to an anchor point near the vehicle floor. A tongue assembly is slidable along the length of belt webbing between the D-ring and the anchor point. The tongue assembly includes a clamping mechanism for clamping the belt webbing. To use the seat belt system, a vehicle occupant grasps the tongue assembly and inserts it into a buckle. When the tongue assembly is fastened in the buckle, a portion of the belt webbing extends across the lap of the vehicle occupant and a portion of the belt webbing extends diagonally across the torso of the vehicle occupant. The clamping mechanism clamps the belt webbing and blocks movement of the belt webbing through the tongue assembly.

When the tongue assembly is engaged with the buckle, the lap and torso portions of the belt webbing are clamped in the clamping mechanism of the tongue assembly. The clamping mechanism of a typical tongue assembly extends across the width of the tongue assembly, transverse to a plane extending longitudinally through the tongue assembly between the leading end or latching portion of the tongue assembly and the trailing end portion of the tongue assembly. The lap and torso portions of the belt webbing extend from the trailing end portion of the tongue assembly. The belt webbing portions preferably extend straight back from the trailing end portion of the tongue assembly—that is, parallel to the above-mentioned plane. If this is the case, the belt webbing portions can extend from the clamping mechanism of the tongue assembly at an angle of 90°. When the belt webbing portions extend from the clamping mechanism at an angle of 90°, the clamping mechanism can effectively clamp across the full width of the webbing portions.

However, depending on the size of the vehicle occupant and the position of the vehicle seat, the lap and torso portions of the belt webbing may not extend straight back from the trailing end portion of the tongue assembly as described above. Further, the lap and torso portions of the belt webbing may extend from the trailing end portion at an angle to each other. Thus, the belt webbing portions may not extend from the clamping mechanism at an angle of 90°. When a belt webbing portion extends from the clamping mechanism at an angle other than 90°, undesirable stresses are placed on the belt webbing, and the edges of the belt webbing can become more susceptible to tearing.

A three-point continuous loop seat belt system may sometimes be used to secure a child seat in the vehicle seat. In this case, it is necessary to fix the length of the lap portion of the belt webbing, so that the child seat can not move relative to the vehicle seat. Thus, it is desirable that a tongue assembly for a three-point continuous loop seat belt system be suitable for securing a child seat. It is also desirable that the belt webbing run relatively freely through the tongue assembly when the tongue assembly is adjacent a D-ring, so that the belt webbing can be completely stowed on the associated retractor.

SUMMARY OF THE INVENTION

The present invention is a tongue assembly for use in a seat belt system in which belt webbing restrains movement of an occupant of a vehicle or of a child seat in a vehicle. The tongue assembly includes a base, a cover rotatable on the base, and a clamping member rotatable with the cover on the base. The clamping member is movable into a clamping position to clamp the belt webbing against the cover to block movement of the belt webbing through the tongue assembly. In a preferred embodiment of the invention, the clamping member is a cam mounted for pivotal movement relative to the cover.

The cover and the clamping member are rotatable together on the base, in response to forces applied to the belt webbing. Thus, when the tongue assembly is fastened in the buckle, the cover and the clamping member, i.e., the clamping mechanism of the tongue assembly, can rotate to accommodate varying orientations of the belt webbing. Accordingly, the belt webbing portions can extend from the clamping mechanism of the tongue assembly at an angle closer to 90° than if the clamping mechanism were not rotatable, thus reducing the stresses on the belt webbing which make the edges of the belt webbing more susceptible to tearing.

BRIEF DESCRIPTION OF THE DRAWINGS

Further features of the present invention will become apparent to those skilled in the art to which the present invention relates from reading the following specification with reference to the accompanying drawings, in which:

FIG. 3 is a view similar to FIG. 2 with parts of the tongue assembly in a different position;

FIG. 4 is a sectional view taken along line 4—4 of FIG. 2 and showing the belt webbing extending through the tongue assembly;

FIG. 5 is a view similar to FIG. 4 showing the tongue assembly in a belt webbing locking condition;

FIG. 6 is a top plan view of the base of the tongue assembly of FIG. 1;

FIG. 7 is a bottom plan view of the cover of the tongue assembly of FIG. 1;

FIG. 8 is a sectional view taken along line 8—8 of FIG. 2 showing the cover only;

FIG. 9 is an elevational view of the cam of the tongue assembly of FIG. 1; and

FIG. 10 is an enlarged sectional view of a portion of the cover of the tongue assembly of FIG. 1.

DESCRIPTION OF A PREFERRED EMBODIMENT OF THE INVENTION

Figure 1:
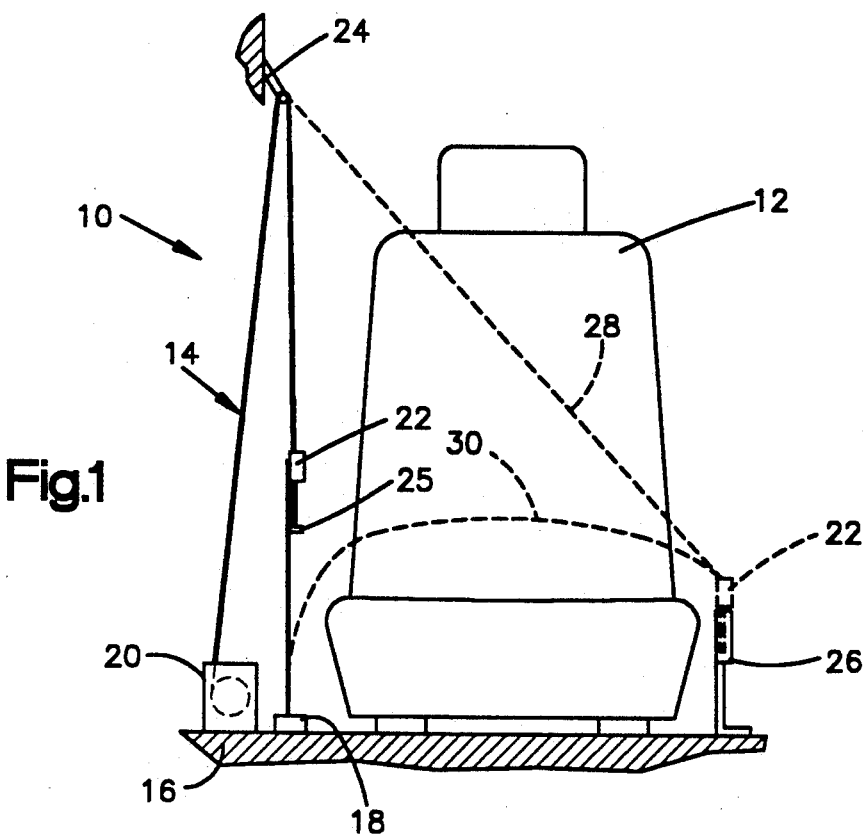
FIG. 1 is a schematic illustration of a vehicle seat belt system having a tongue assembly in accordance with the present invention.

The present invention is illustrated in FIG. 1 as applied to a three-point continuous loop seat belt system 10 for use in restraining an occupant of a vehicle against movement relative to the vehicle. The following description assumes that the seat belt system 10 is used in restraining a vehicle occupant. It should be understood that the seat belt system 10 could be used to restrain a child seat. It should further be understood that the invention could be applied to other belt systems.

During operation of the vehicle, an occupant of the vehicle sits on a seat 12 which is illustrated as a front passenger seat in the vehicle. A length of belt webbing 14 is extendible about the vehicle occupant. One end of the length of belt webbing 14 is anchored to the vehicle body 16 at an anchor point 18 on the outboard side of the seat. The opposite end of the belt webbing 14 is attached to a retractor 20 secured to the vehicle body also on the outboard side of the seat. Intermediate its ends, the belt webbing 14 passes through a tongue assembly 22 and through a D-ring 24 mounted on the vehicle above the retractor 20 and the anchor point 18. When the seat belt system 10 is not in use, the belt webbing 14 is wound on the retractor 20 and is oriented generally vertically on the outboard side of the seat 12, as shown in solid lines in FIG. 1. The tongue assembly 22 is free-falling and stops at a predetermined stop point 25.

To engage the seat belt system 10, the tongue assembly 22 is manually grasped and is pulled across the lap and torso of the occupant sitting in the seat 12. As the tongue assembly 22 is pulled across the lap and torso of the occupant, the tongue assembly moves along the belt webbing 14, and the belt webbing 14 is unwound from the retractor 20. When the belt webbing 14 has been pulled across the lap and torso of the occupant, the tongue assembly 22 is connected with a buckle 26, as shown in dashed lines in FIG. 1. The buckle 26 is connected to the vehicle body 16 and is disposed on the inboard side of the seat 12 opposite the anchor point 18. When the seat belt system 10 is thus buckled, the length of belt webbing 14 is divided by the tongue assembly into a torso portion 28 which extends across the torso of the occupant and a lap portion 30 which extends across the lap of the occupant.

Figure 2:
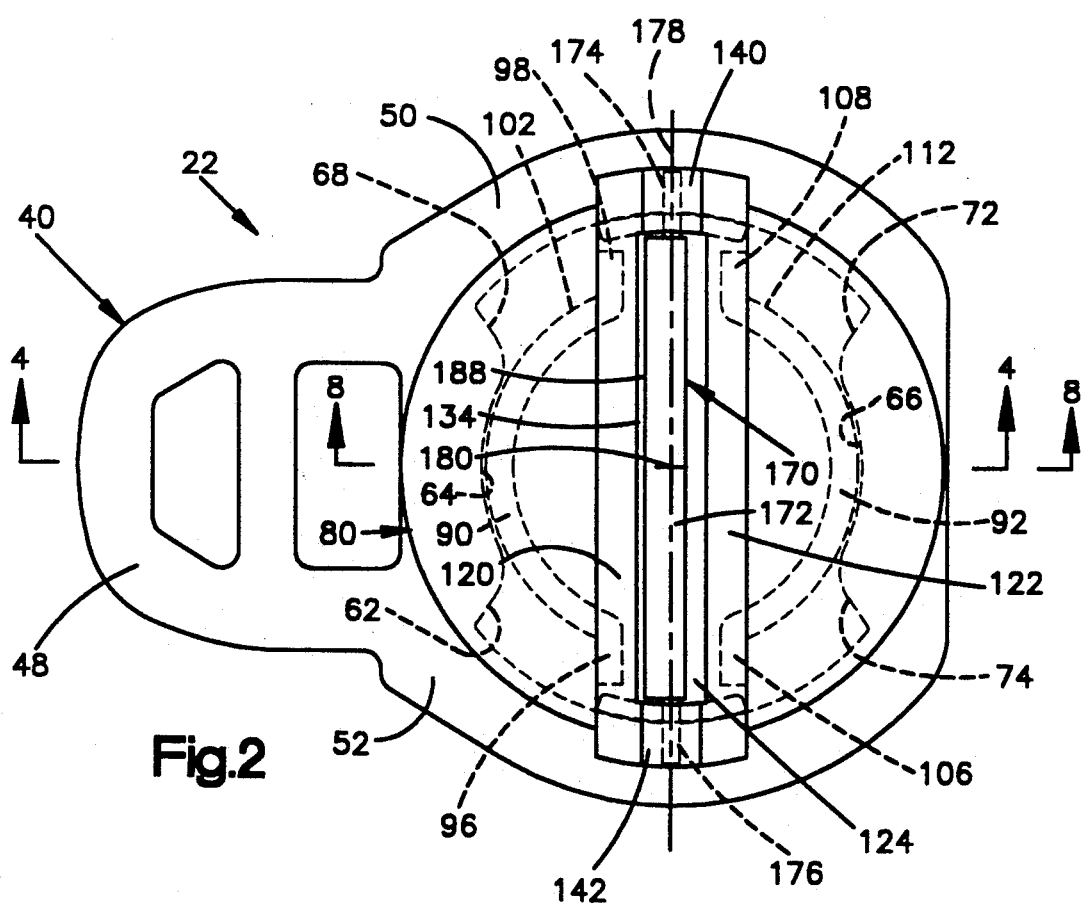
FIG. 2 is a top plan view of the tongue assembly of FIG. 1.

The tongue assembly 22 includes a base 40 (FIGS. 2, 4 and 6). The base 40 is a planar piece of metal preferably made from AISI 4130 steel which is heat treated and chrome plated. The base 40 has an upper major side surface 42 and a lower major side surface 44 (FIG. 4). A latching portion 48 (FIG. 6) at one end of the base is adapted for engagement with the buckle 26 in a known manner. The base 40 also includes a trailing end portion 54 and opposite side portions 50 and 52 that extend between the latching portion 48 and the trailing end portion 54. The side portion 50 has an upper surface 56 which is part of the upper major side surface 42 of the base 40. The side portion 52 has an upper surface 58 which is part of the upper major side surface 42 of the base 40.

A webbing opening 60 (FIG. 6) extends through the base 40 between the upper major side surface 42 and the lower major side surface 44. The webbing opening 60 is defined by an edge surface 62 of the base 40. The edge surface 62 includes an arcuate guide surface 64 on the latching portion 48 of the base 40 and an arcuate guide surface 66 on the trailing end portion 54 of the base. The guide surfaces 64 and 66 are formed as arcs of a circle. A pair of stop surfaces 68 and 70 are located at the ends of the guide surface 64. A pair of stop surfaces 72 and 74 are located at the ends of the guide surface 66. The edge surface 62 also includes an arcuate surface 76 on the side portion 50 of the base 40 which extends between the stop surfaces 68 and 72. A similar arcuate surface 78 on the side portion 52 extends between the stop surfaces 70 and 74.

The tongue assembly 22 also includes a cover 80 (FIGS. 2, 7 and 8). The cover 80 is preferably molded from an acetal resin, such as Delrin ® (a trademark of E. I. Du Pont de Nemours & Company) brand resin. The cover 80 includes a flat circular body portion 82. The body portion 82 has an upper major side surface 84 (FIG. 8), a lower major side surface 86 and a circular outer edge 88.

A pair of ribs 90 and 92 (FIG. 7) project from the lower major side surface 86 of the cover 80. The rib 90 includes a semi-circular portion 94 and two end portions 96 and 98. The rib 90 has a radially inner side surface 100 and a radially outer side surface 102. The rib 92 is a mirror image of the rib 90 and includes a semi-circular portion 104 and two end portions 106 and 108. The rib 92 has a radially inner side surface 110 and a radially outer side surface 112.

A pair of raised portions 120 and 122 (FIGS. 2 and 8) project from the upper major side surface 84 of the cover 80. The raised portions 120 and 122 extend approximately diametrically across the cover 80. The raised portions 120 and 122 are spaced apart and define between them a webbing opening 124 (FIG. 7) in the cover 80. The raised portion 122 has a flat upper surface 126 (FIG. 8). A surface 128 extends at an angle between the flat upper surface 126 and the lower major side surface 86 of the cover 80. The raised portion 120 has a flat upper surface 130. A surface 132 extends at an angle between the flat upper surface 130 and the lower major side surface 86 of the cover 80. The flat upper surface 130 and the angled surface 132 intersect at an edge 134.

At the radially outward ends of the raised portions 120 and 122 are located a pair of arch-shaped cam retainers 140 and 142 (FIGS. 2 and 8). The cam retainers 140 and 142 project upward from the upper major side surface 84 of the cover 80. A pin slot 144 (FIG. 7) extends radially through the cam retainer 140. A pin slot 146 extends radially through the cam retainer 142.

On the bottom of the cover 80, under the cam retainer 142, are a pair of cover retainer tabs 150 (FIGS. 7 and 10). The cover retainer tabs 150 project axially downward from the lower major side surface 86 of the cover 80. A tab end portion 152 extends radially outward from the lower end of each tab 150.

Similarly, under the cam retainer 140, there are a pair of cover retainer tabs 160 (FIGS. 7 and 8) which are like the tabs 150. The cover retainer tabs 160 project axially downward from the lower major side surface 86 of the cover 80. A tab end portion 162 extends radially outward from the lower end of each tab 160.

The tongue assembly 22 also includes an elongate cam 170 (FIGS. 2 and 9) which is preferably made from aluminum. The cam 170 has an axially extending belt clamping portion 172 which is at least as wide as the belt webbing 14. A pair of cylindrical support pins 174 and 176 extend from the opposite axial ends of the belt clamping portion 172 of the cam 170. The belt clamping portion 172 of the cam 170 has first and second opposite side surfaces 184 and 186.

The cover 80 is mounted on the base 40. The lower major side surface 86 of the cover 80 is in abutting engagement with the upper major side surface 42 of the base 40. Adjacent the side portion 50 of the base 40, the cover retaining tabs 160 extend axially downward through the webbing opening 60 in the base 40. The tab end portions 162 of the tabs 160 project radially outward under the side portion 50. Adjacent the side portion 52 of the base 40, the cover retaining tabs 150 extend axially downward through the webbing opening 60 in the base. The tab end portions 152 of the tabs 150 project radially outward under the side portion 52. The tab end portions 152 and 162 prevent the cover 80 from coming off the base 40.

When the cover 80 is mounted on the base 40, the ribs 90 and 92 on the cover 80 project axially downward through the webbing opening 60 in the base 40. The outer side surface 102 of the rib 90 is in abutting engagement with the guide surface 64 of the base 40. The outer side surface 112 of the rib 92 is in abutting engagement with the guide surface 66 of the base 40.

The cover 80 is rotatable on the base 40 about an axis 180 (FIGS. 2-5) which extends perpendicular to the plane of the base 40. The axis 180 is the axis of the webbing opening 60 in the base 40, and extends through the center of the webbing opening 60. In a preferred embodiment, the cover 80 is rotatable on the base 40 through a range of movement of about 70° (seventy degrees). The sliding engagement of the ribs 90 and 92 with the guide surfaces 64 and 66 of the base 40, and the sliding engagement of the cover tabs 150 and 160 with the side portions 58 and 60, respectively, of the base 40, guide the rotational movement of the cover 80 on the base 40.

The rotational movement of the cover 80 on the base 40 is limited by engagement of the end portions of the ribs 90 and 92 with the stop surfaces on the base 40. At one end of the range of movement, as seen in FIG. 3, the end portion 98 of the rib 90 engages the stop surface 68 (FIG. 2) on the base 40, and the end portion 106 on the rib 92 engages the stop surface 74 (FIG. 2) on the base 40. At the opposite end of the range of movement, which position is not illustrated, the end portion 108 on the rib 92 engages the stop surface 72 on the base 40, and the end portion 96 on the rib 90 engages the stop surface 62 on the base 40. In between these extremes of rotational movement, such as in the position seen in FIG. 2, the cover 80 is freely rotatable on the base 40 about the axis 180.

The cam 170 is retained between the cover 80 and the base 40. At one end of the cam 170, the cam support pin 174 is received in the slot 144 in the cam retainer 140 of the cover 80. The cam support pin 174 rests on the upper surface 56 of the side portion 50 of the base 40. The cam retainer 140 prevents the cam support pin 174 from moving off the upper surface 56 of the base side portion 50. At the other end of the cam 170, the cam support pin 176 is received in the slot 146 in the cam retainer 142 of the cover 80. The cam support pin 176 rests on the upper surface 58 of the side portion 52 of the base 40. The cam retainer 142 prevents the cam support pin 176 from moving off the upper surface 58 of the base side portion 52. Because the cam 170 is retained between the cover 80 and the base 40, the cam 170 rotates with the cover 80, about the axis 180, when the cover 80 rotates on the base 40 as described above.

The cam 170 is pivotable on the upper major side surface 42 of the base 40 about an axis 178 (FIGS. 2 and 9). The axis 178 extends along the longitudinal extent of the cam 170 and through the cylindrical cam support pins 174 and 176. The axis 178 is eccentric relative to the center of mass of the cam 170 and the height of the cam (as viewed in section in FIG. 4, for example). The axis 178 is not collinear with the axis 180 about which the cover 80 rotates. The cam 170 is pivotable between the positions shown in FIGS. 4 and 5.

The belt webbing 14 (FIGS. 4 and 5) extends through the webbing opening 60 in the base 40 and through the webbing opening 124 in the cover 80. The belt webbing 14 passes between the edge 134 on the raised portion 120 of the cover 80, and the first side surface 184 of the cam 170.

FIGS. 2-4 illustrate the parts of the tongue assembly 22 in an unlocked condition. This is the condition of the tongue assembly 22 when, for example, the belt webbing 14 of the seat belt system 10 (FIG. 1) is stowed and the tongue assembly 22 is at the stop point 25. In this unlocked condition, the belt webbing 14 is movable through the tongue assembly 22 and in a direction generally parallel to the plane of the base 40.

In the unlocked condition, the cam 170 is positioned as viewed in FIG. 4. There is sufficient distance between the first side surface 184 of the cam 170 and the edge 134 on the cover 80 so that the belt webbing 14 can run relatively freely between the cam 170 and the cover 80. The cover 80 is rotatable on the base 40, as described above.

The vehicle occupant buckles the seat belt system 10 (FIG. 1) by engaging the latching portion 48 of the tongue assembly 22 with the buckle 26. The vehicle occupant pulls the torso portion of the belt webbing 14 until enough belt webbing 14 passes through the tongue assembly 22 to make the lap portion 30 fit tightly around the occupant's lap. The vehicle occupant then releases the torso portion of the belt webbing 14 and the seat belt system 10 is in the buckled condition as shown in dashed lines in FIG. 1.

The belt webbing 14 assumes a U-shape within the tongue assembly 22, as seen in FIG. 5, when the seat belt system 10 is buckled. Both the lap portion 30 and the torso portion 28 of the belt webbing 14 extend from the trailing end portion 54 of the tongue assembly 22. The lap portion 30 of the belt webbing 14 is tight around the occupant's lap and is therefore under tension. This tensile force acts on the lap portion 30 of the belt webbing 14 in the direction indicated by the arrow 190 in FIG. 5. The torso portion 28 of the belt webbing 14 also may be under tensile force applied by the retractor 20.

Although both the lap portion 30 and the torso portion 28 of the seat belt webbing 14 engage and apply loads to the cam 170, the eccentric placement of the pivot axis 178 causes the load from the lap portion to have a longer moment arm and thus apply a higher torque to the cam. The unequal torques thus applied by the belt webbing 14 cause the cam 170 to pivot about the axis 178 from the unlocked position shown in FIG. 4 to the belt webbing locking position shown in FIG. 5. The first side surface 184 on the cam 170 presses the belt webbing 14 against the edge 134 on the cover 80. Thus, the belt webbing 14 is clamped in the tongue assembly 22, and the length of the lap portion 30 of the belt webbing 14 is fixed. The tongue assembly 22 is in its locked condition.

When the tongue assembly 22 is in the locked condition, the belt webbing 14 is clamped between the cover 80 and the cam 170, but the belt webbing 14 is not clamped against the base 40. Thus, the cover 80 and the cam 170, i.e., the clamping mechanism of the tongue assembly 22, are still rotatable on the base 40 about the axis 180. The clamping mechanism can rotate to a position dictated by the forces applied by the belt webbing 14. This can allow the belt webbing to extend from the clamping mechanism of the tongue assembly 22 at an angle closer to 90° (as described above) than if the clamping mechanism were not rotatable. Accordingly, the belt webbing 14 can be more effectively clamped across its full width, and undesirable stresses on the edge portions of the belt webbing 14 are minimized. It should be noted that the cam 170 is pivotable about its axis 178 into the clamping position shown in FIG. 5 regardless of the rotational position of the cover 80 and the cam 170 relative to the base 40.

When the vehicle occupant unbuckles the seat belt system 10, the tension on the lap portion 30 of the belt webbing 14 is released. The retractor 20 pulls on the torso portion 28 of the belt webbing 14 and winds belt webbing on the retractor 20. The tongue assembly 22 is pulled across the torso of the vehicle occupant and falls along the belt webbing 14 until the tongue assembly 22 reaches the stop point 25. The cam 170 pivots back to the unlocked position shown in FIG. 4, and there is sufficient clearance for the belt webbing 14 to run relatively freely through the tongue assembly 22 between the cam 170 and the cover 80.

As noted above, the seat belt system 10 can also be used for restraining a child seat (not shown) in the vehicle seat 12. The seat belt system 10, when used for restraining a child seat in the seat 12, is buckled so that the lap portion 30 of the belt webbing 14 holds the child seat on the vehicle seat 12. When the tongue assembly 22 is engaged in the buckle 26, the cam 170 is in the clamping position shown in FIG. 5. The tongue assembly 22 clamps the seat belt webbing 14 so that the lap portion 30 of the belt webbing 14 cannot be lengthened. Thus, the child seat is securely held in position on the vehicle seat 12.

From the foregoing description of the invention, those skilled in the art will perceive improvements, changes and modifications in the invention. Such improvements, changes and modifications within the skill of the art are intended to be covered by the appended claims.

We claim:

1. A tongue assembly for use in a safety apparatus in which belt webbing restrains movement, said tongue assembly comprising:
   a base having a portion which is latchable in the buckle, said base having an opening through which the belt webbing is extensible, said opening having an axis;
   means for defining a first belt webbing clamping surface on said base;
   a clamping member having a second belt webbing clamping surface, said clamping member being movable between a first position in which said clamping member clamps the belt webbing against said first belt webbing clamping surface on said base to block movement of the belt webbing through said opening and a second position in which the belt webbing is movable through said opening; and
   means for mounting said first belt webbing clamping surface and said clamping member for rotation about the axis of said opening in response to forces acting on the belt webbing.

2. A tongue assembly as defined in claim 1 wherein said means for mounting comprises a cover mounted for sliding movement on said base about said axis of said opening and retaining said clamping member on said base, said first belt webbing clamping surface being on said cover.

3. A tongue assembly as defined in claim 2 wherein said first belt webbing clamping surface at least partially defines a second opening in said cover through which the belt webbing is extensible, said axis extending through the center of said second opening.

4. A tongue assembly as defined in claim 1 wherein said clamping member comprises an elongate member at least as wide as the belt webbing, the belt webbing being extensible at least partially around said elongate member, said elongate member being pivotable into its first position about a pivot axis not collinear with said axis of said opening.

5. A tongue assembly for use in a safety apparatus in which a belt webbing restrains movement, said tongue assembly comprising:
   a base;
   a rotatable member rotatable relative to said base; and
   a clamping member rotatable with said rotatable member relative to said base, said clamping member being movable into a clamping position to clamp the belt webbing against said rotatable member to block movement of the belt webbing through the tongue assembly;
   said base including surface means for defining a webbing opening in said base, the belt webbing being extensible through said webbing opening in said base;
   said rotatable member having guide portions disposed in said webbing opening in said base.

6. A tongue assembly for use in a safety apparatus in which a belt webbing restrains movement, said tongue assembly comprising:
   a base having a substantially planar portion; and
   clamping means for clamping the belt webbing to block movement of the belt webbing through the tongue assembly, said clamping means being rotatable on said base in a plane parallel to the plane of said planar portion of said base in response to forces applied to the belt webbing;
   said base having an opening through which the belt webbing extends, said opening having an axis and said clamping means being rotatable on said base about the axis of said opening.

7. A tongue assembly for use in a safety apparatus in which a belt webbing restrains movement, said tongue assembly being slidable on the belt webbing and dividing the belt webbing into a lap portion and a shoulder portion each extending away from said tongue assembly, said tongue assembly comprising:
   a base having a substantially planar portion;
   clamping means for clamping the belt webbing to block movement of the belt webbing through said tongue assembly; and
   means for mounting said clamping means for rotation on said base, in a plane parallel to the plane of said planar portion of said base, when said clamping means is clamping the belt webbing, in response to forces applied to the lap portion of the belt webbing and in response to forces applied to the shoulder portion of the belt webbing;
   said base having an opening through which the belt webbing is extensible, said clamping means blocking movement of the belt webbing through the opening in said base while permitting rotational movement of the belt webbing within the opening in said base.

* * * * *